United States Patent
So

(10) Patent No.: US 7,917,653 B2
(45) Date of Patent: Mar. 29, 2011

(54) SYNCML DATA SYNC SYSTEM AND DATA EXCHANGING METHOD FOR DATA EXCHANGE BETWEEN CLIENTS

(75) Inventor: Young-Jun So, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1062 days.

(21) Appl. No.: 11/352,641

(22) Filed: Feb. 13, 2006

(65) Prior Publication Data

US 2006/0200596 A1    Sep. 7, 2006

(30) Foreign Application Priority Data

Mar. 3, 2005  (KR) .................. 10-2005-0017864

(51) Int. Cl.
*G06F 15/16* (2006.01)
*G06F 15/173* (2006.01)
*G06F 7/04* (2006.01)
(52) U.S. Cl. ............................. 709/248; 709/225; 726/5
(58) Field of Classification Search .................. 709/225, 709/248; 715/234; 726/5
See application file for complete search history.

(56) References Cited

U.S. PATENT DOCUMENTS

| | | | | |
|---|---|---|---|---|
| 6,671,757 | B1* | 12/2003 | Multer et al. ................. | 710/100 |
| 2003/0172175 | A1* | 9/2003 | McCormack et al. ........ | 709/232 |
| 2004/0006713 | A1* | 1/2004 | Minemura .................... | 713/201 |
| 2004/0024846 | A1* | 2/2004 | Randall et al. ................ | 709/219 |
| 2004/0142711 | A1* | 7/2004 | Mahonen et al. ............. | 455/502 |
| 2004/0268148 | A1* | 12/2004 | Karjala et al. ................ | 713/201 |
| 2006/0052091 | A1* | 3/2006 | Onyon et al. ................. | 455/415 |
| 2006/0200583 | A1* | 9/2006 | Le Lann et al. .............. | 709/249 |

* cited by examiner

*Primary Examiner* — Ranodhi N Serrao
(74) *Attorney, Agent, or Firm* — The Farrell Law Firm, P.C.

(57) ABSTRACT

Disclosed is a SyncML data sync system and a data exchanging method thereof for data exchange between clients. A sync server receives data to be provided to another client and authentication of a target client to which the data is provided from a first client, and transmits a signal reporting that the data has been provided to the target client. A second client according to the authentication information of the target client transmits its own authentication information to the remote sync server if it receives the signal reporting that the data has been provided. The sync server receives the authentication information of the second client, authenticates whether the second client is the target client, and provides the data to the second client. Accordingly, the data can be exchanged between a certain client and another client.

11 Claims, 4 Drawing Sheets

SYNCML DATA SYNC SYSTEM AND DATA EXCHANGING METHOD FOR DATA EXCHANGE BETWEEN CLIENTS

PRIORITY

This application claims priority to an application entitled "SyncML Data Sync System and Data Exchanging Method for Data Exchange Between Clients" filed in the Korean Industrial Property Office on Mar. 3, 2005 and assigned Serial No. 2005-17864, the contents of which are incorporated herein by reference.

BACKGROUND OF THE INVENTION

1. Field of the Invention

The present invention relates to data exchange for mobile communication terminals, and more particularly to data exchange using a remote sync server.

2. Description of the Related Art

Generally, synchronization (sync) refers to a process that makes data in an application or a system coincide with data in the same or a different application or system. Such a sync process is for storing data stored in a mobile communication terminal in a server such as a PC (Personal Computer) and the like for the purpose of backup. Accordingly, a user can store PIM (Personal Information Management) data stored in a mobile communication terminal in a server using such a sync process, and also can store data stored in the server in the mobile communication terminal in synchronization with the mobile communication terminal.

Since a typical data sync system uses an international standard protocol SyncML (Synchronization Markup Language), it is called a SyncML data sync system. This SyncML data sync system is classified into a local SyncML data sync system and a remote SyncML data sync system according to restrictions put on a distance between a mobile communication terminal, i.e., client, and a server. In the local SyncML data sync system, a client located within a limited distance can exchange data with a server using a local interface such as a USB (Universal Serial Bus) interface, an IrDA infrared interface, a Bluetooth interface, etc. In the remote SyncML data sync system, a client that is not restricted by distance can exchange data with a server using a remote interface such as an HTTP protocol interface, a TCP/IP protocol interface, etc.

FIG. 1 is a block diagram illustrating the construction of a typical remote SyncML data sync system using an HTTP interface. Referring to FIG. 1, the remote SyncML data sync system is provided with a remote sync server 150 and a client 100, which are connected together by an HTTP interface through an HTTP server 152 and an HTTP client 104. If the HTTP server 152 receives a sync request signal input from the client 100 through the HTTP interface, a remote sync server control unit 158 controls a sync server engine 154 to perform synchronization with the client. Also, the sync server control unit 158 analyzes PIM data from a client PIM data storage unit 108 according to the control of the client 100, and synchronizes the analyzed PIM data with PIM data stored in a server PIM DB 156 or synchronizes the PIM data stored in the server PIM DB 156 with the PIM data stored in the client PIM data storage unit 108. Accordingly, users can implement a remote data sync, and store their own PIM data in the remote sync server 150 or store the PIM data stored in the remote sync server 150 in the client 100 irrespective of the distance between the client 100 and the remote sync server 150.

Although FIG. 1 exemplifies only the remote SyncML data sync system that uses the HTTP as its interface, a remote SyncML data sync system or a local SyncML data sync system which uses TCP/IP protocol that is different from the HTTP as its interface operates in the same manner. Accordingly, the user of the mobile communication terminal, i.e., the client, can backup, inquire or manage his her own PIM data using the sync server.

However, the typical SyncML data sync system as described above performs the sync of PIM data only with respect to a client from which a sync request is received. Accordingly, the system server of the SyncML data sync system only allows a certain client to perform the sync of PIM data stored in the server, but does not allow another client to perform the sync of the PIM data. Consequently, the typical SyncML data sync system has a problem in that it is impossible to exchange the PIM data of a certain client with another client.

SUMMARY OF THE INVENTION

Accordingly, the present invention has been designed to solve the above and other problems occurring in the prior art, and an object of the present invention is to provide a SyncML data sync system and a data exchanging method thereof that can allow a certain client and another client to exchange data with each other.

In order to accomplish the above and other objects, a SyncML (Synchronization Markup Language) data sync (synchronization) system for data exchange between clients according to the present invention includes a first client having client data to be provided to another client and authentication information of a target client to which the client data is provided, a second client corresponding to the authentication information of the target client, and a sync server for providing the client data to the second client if a sync request is received from the first client by performing a sync with the first client, receiving the client data through the sync, transmitting a sync request signal to the second client using the target authentication information of the first client, receiving the authentication information from the second client and authenticating the second client, requesting a data access password from a user of the second client and authenticating the user of the second client, and then performing a sync with the second client.

In another aspect of the present invention, there is provided a data exchanging method for data exchange between clients in a SyncML (Synchronization Markup Language) data sync (synchronization) system provided with a sync server and first and second clients connected to the sync server using one of a remote interface and a local interface, which includes an authentication information providing step of the sync server receiving client data to be provided to the second client in synchronization with the first client and authentication information of the second client, an authentication step of the sync server informing the second client of the providing of the client data and authenticating the second client according to the authentication information and a data access password received from a second client, and a client data providing step of the sync server providing the client data to the second client according to appliance information received from the second client if the second client is a target client.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
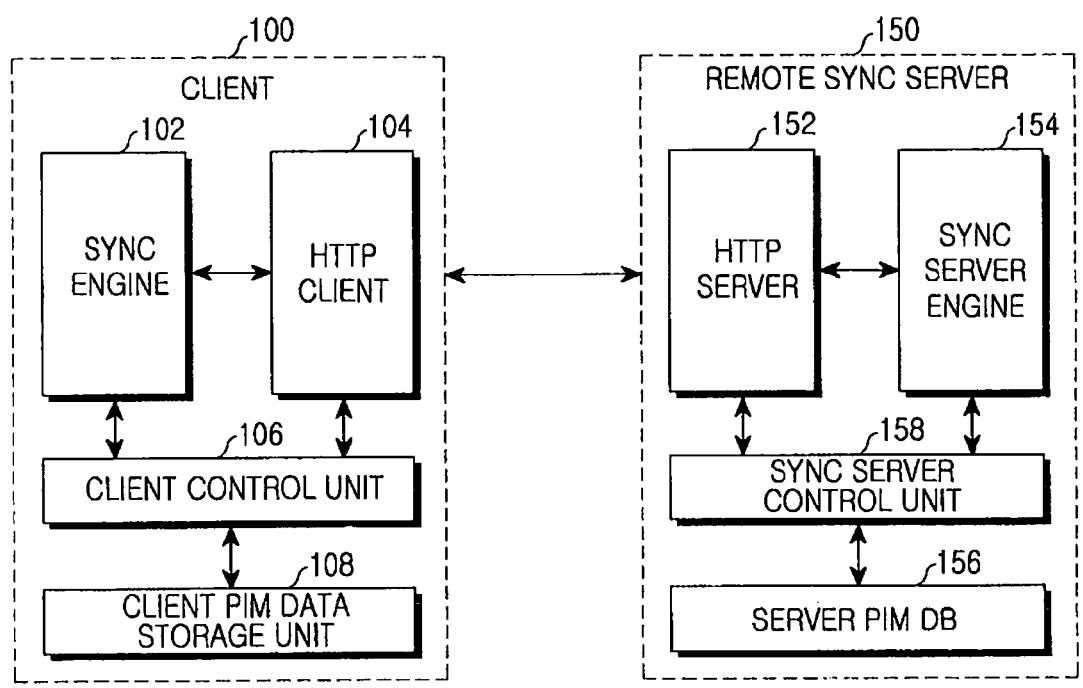
FIG. 1 is a block diagram illustrating the construction of a typical remote SyncML data sync system using an HTTP interface.

Preferred embodiments of the present invention will be described in detail hereinafter with reference to the accompanying drawings. In the following description of the present invention, the same drawing reference numerals are used for the same elements even in different drawings. Additionally, a detailed description of known functions and configurations incorporated herein will be omitted when it may obscure the subject matter of the present invention.

If a sync (synchronization) server receives a sync request signal from a first client, it performs a sync of the first client, and receives data to be provided to another client and authentication information of a target client to which the other client will provide the data. If the providing of the data from the first client is completed, the sync server transmits a signal reporting that the data has been provided from the first client to the target client. Then, if a second client according to the authentication information of the target client receives the signal reporting that the data has been provided from the sync server, it transmits its own authentication information to the sync server in response to the received signal. Then, the sync server receives the authentication information of the second client, and authenticates whether the second client is the target client through the comparison of the authentication information of the second client with the authentication information of the target client provided from the first client. If the authentication is completed, the remote sync server authenticates the user of the second client by requesting a data access password to the user of the second client, and if the authentication is completed, it provides the data to the second client. Here, the data provided from the first client to the second client may include general contents data such as image or multimedia data, wallpaper image data, a bell sound, etc., in addition to PIM data of the first client. Accordingly, the data provided from the first client to the second client will hereinafter be called client data that includes both the PIM data and general contents data.

Although the present invention can also be applied to a local SyncML (Synchronization Markup Language) data sync system using a local interface, a remote SyncML data sync system using a remote interface will be exemplified in the following description for convenience in explanation.

Figure 2:
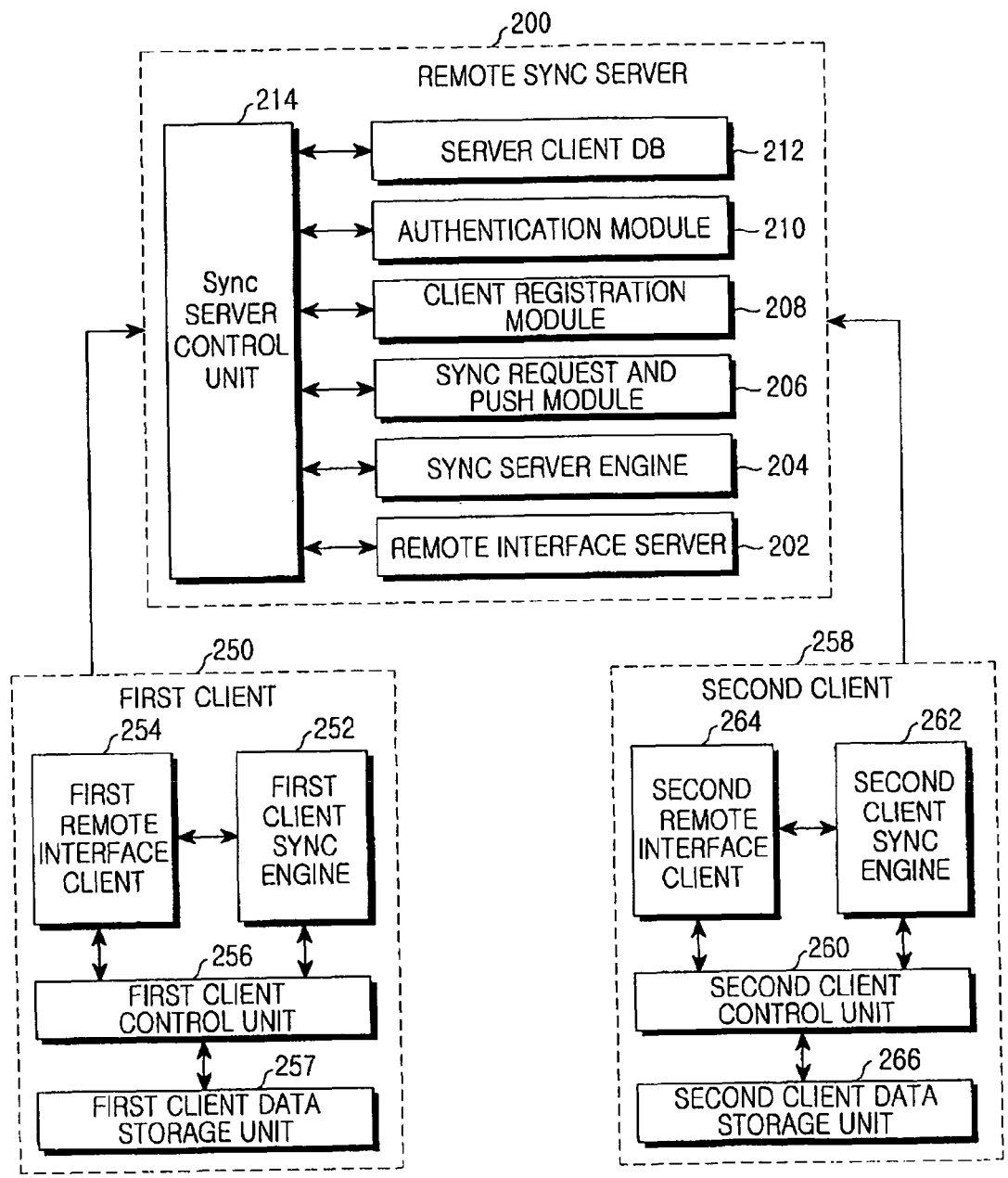
FIG. 2 is a block diagram illustrating the construction of a SyncML data sync system for data exchange between a first client and a second client according to an embodiment of the present invention.

FIG. 2 is a block diagram illustrating the construction of a SyncML data sync system for data exchange between a first client and a second client according to an embodiment of the present invention.

Referring to FIG. 2, the SyncML data sync system includes a first client 250 for transmitting the client data to a remote sync server 200, and a second client 258 for receiving the client data from the remote sync server 200.

In the first client 250, a first remote interface client 254, a first client sync engine 252 and a first client data storage unit 257 are connected to a first client control unit 256. The first remote interface client 252 inputs a sync request signal to the remote control server 200 through a remote interface. Also, the first client sync engine 252 performs a sync with the remote sync server 200 under the control of the first client control unit 256, and the client data storage unit 257 stores the client data of the user of the first client 250. The first client control unit 256 controls the whole operation of the first client 250 and transmits the sync request signal to the remote sync server 200 according to the selection of the user of the first client 250. The first client control unit 256 also performs a sync with the remote sync server, and transmits the client data stored in the first client data storage unit 257 and authentication information of a target client to which the client data will be provided to the remote sync server 200.

In the remote sync server 200, a remote interface server 202, a sync server engine 204, a sync request and push module 206, a client registration module 208, an authentication module 210 and a server client DB 212 are connected to a sync server control unit 214. The sync server engine 204 receives the sync request signal transmitted from the first client 250 through the remote interface, and transmits the sync request signal to the second client 258 under the control of the remote sync server control unit 214. If the sync request signal is received from the first client 250, the sync server engine 204 performs the sync with the first client 250, and if the authentication of the second client is completed, it performs the sync with the second client 258 under the control of the remote sync server control unit 214.

The sync request and push module 206, if the input of the client data from the first client 250 is completed, transmits the sync request signal and a signal for reporting the providing of the client data to the second client 258 under the control of the remote sync server control unit 214. The client registration module 208 stores information on the first client 250 and the authentication information of the target client which is provided from the first client 250 and to which the client data will be provided. The authentication module 210 authenticates whether the second client 258 is the target client and whether the user of the second client 258 is the user authenticated from the user of the first client 250 according to the authentication information. The server client DB 212 stores the client data provided from the first client 250 and the synchronized client data. The remote sync server control unit 214 controls the whole operation of the remote sync server 200, checks whether the client data and the authentication information of the target client are provided from the first client 250, and transmits the signal for reporting the providing of the client data to the second client 258 according to the authentication information of the target client. Additionally, the remote sync server control unit 214 receives the authentication information from the second client 258 and authenticates whether the second client 258 is the target client. If the authentication is completed, the remote sync server control unit 214 provides the client data to the second client 258 by synchronizing the client data of the second client 258 with the client data stored in the server client DB 212 through the sync with the second client 258.

In the second client 258, a second remote interface client 264, a second client sync engine 262 and a second client data storage unit 266 are connected to a second client control unit 260. The second remote interface client 264 receives the sync request signal from the remote sync server 200 through a remote interface. Also, the second client sync engine 262 performs a sync with the remote sync server 200, and the second client data storage unit 266 stores the synchronized client data from the remote sync server 200. The second client control unit 260 controls the whole operation of the second client 258, and if the sync request and client data providing signals have been received from the remote sync server 200, it controls the sync of the second client sync engine 262 according to the sync request signal. Also, the second client control unit 260 inputs the authentication information of the second client 258 to the remote sync server 200, and if the authentication is completed, it synchronizes the client data input from the remote sync server 200 with the client data of the second client 258. Accordingly, in the present invention, even if the second client 258 designated from the first client 250 has no connection information for connecting to the remote sync server 200, it can receive the client data provided from the first client through the sync request of the remote sync server 200.

Figure 3:
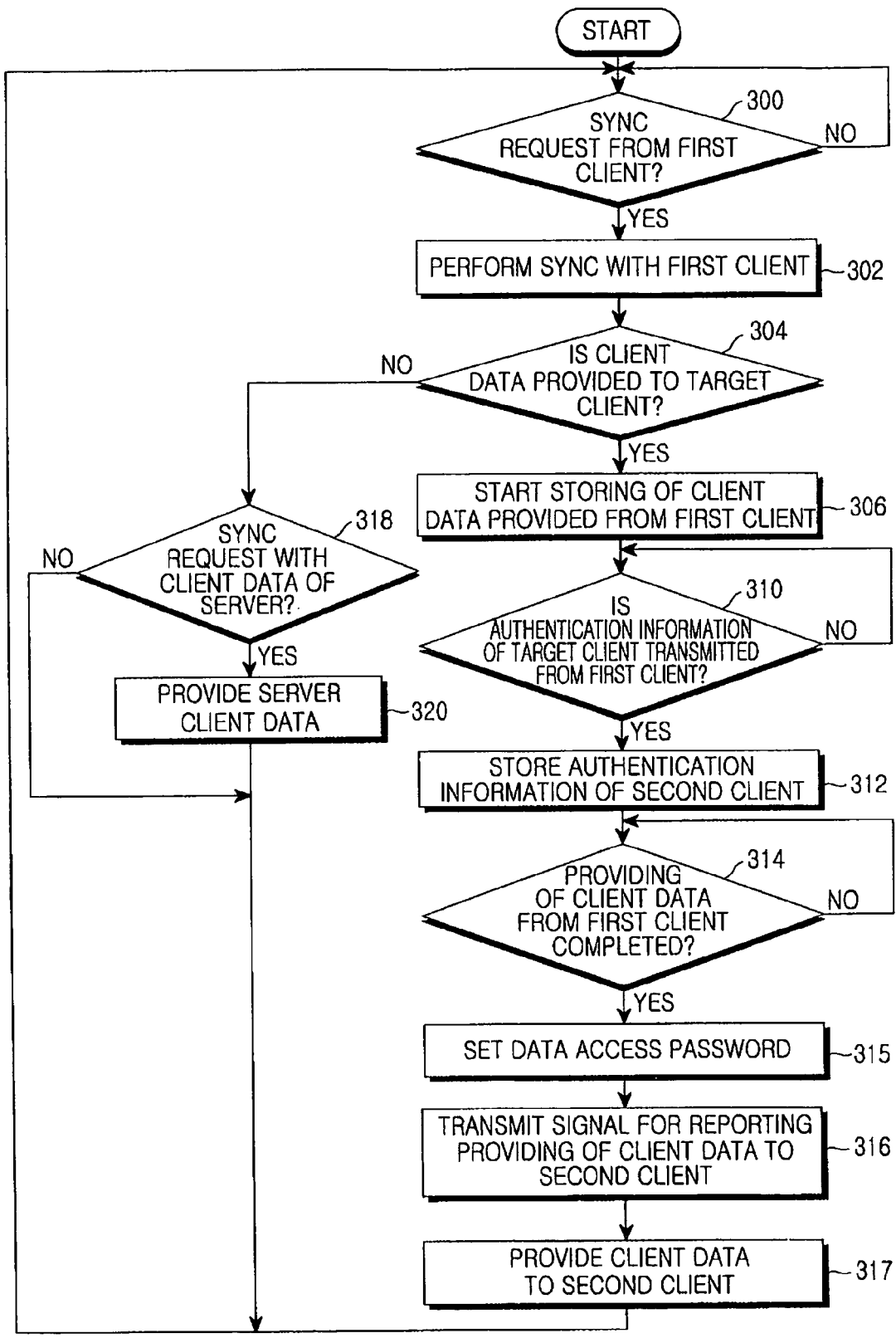
FIG. 3 is a flowchart illustrating a process of receiving data from the first client that is performed by a remote sync server in the SyncML data sync system according to an embodiment of the present invention.

FIG. 3 is a flowchart illustrating the process of receiving data from the first client 250 that is performed by the remote sync server 200 in the SyncML data sync system according to an embodiment of the present invention.

Referring to FIG. 3, if the power is on, the remote sync server control unit 214 proceeds to step 300 and checks whether a sync request is received from the first client 250. If the sync request is received from the first client 250 at step 300, the remote sync server control unit 214 proceeds to step 302 and performs a sync for data exchange with the first client 250. Then, the remote sync server control unit 214 proceeds to step 304 and checks whether the first client 250 selects to provide the client data to another client.

If the first client 250 does not select to provide the client data to another client at step 304, the remote sync server control unit 214 proceeds to step 318 and checks whether the first client 250 has requested the sync of the client data with the client data stored in the server client DB 212 of the remote sync server 200. If the first client 250 has requested the sync of the client data with the client data stored in the remote sync server 200 at step 318, the remote sync server control unit 214 proceeds to step 320, synchronizes the client data of the first client 250 with the client data stored in the remote sync server 200, and provides the client data stored in the remote sync server 200 to the first client 250. Then, the remote sync server control unit 214 proceeds again to step 300 and checks whether the sync request is received from the first client 250.

Meanwhile, if the first client 250 selects to provide the client data to another client at step 304, the remote sync server control unit 214 proceeds to step 306 and starts to store the client data provided from the first client 250. Then, the remote sync server control unit 214 proceeds to step 310 and checks whether the authentication information of the target client to which the client data will be provided is transmitted from the first client 250. Here, the authentication information of the target client means inherent information of the target client from which the target client can be identified such as a caller identification (ID) of the target client, user information of the target client, etc. Also, the authentication information is used to transmit the signal for reporting the providing of the client data from the first client 250 and the sync request signal to the target client.

If the authentication information of the target client is transmitted from the first client 250 at step 310, the remote sync server control unit 214 proceeds to step 312 and stores the received authentication information of the second client. If the authentication information is stored at step 312, the remote sync server control unit 214 registers the client according to the authentication information in the client registration module 208 of the remote sync server 200. Then, the remote sync server control unit 214 proceeds to step 314 and checks whether the transmission of the client data from the first client 250 is completed. If the transmission of the client data from the first client 250 is completed, the remote sync server control unit 214 proceeds to step 315, requests the first client 250 to set a data access password for accessing the client data to be stored in the first client 250, and sets the data access password transmitted from the first client 250. Here, the data access password is for checking whether the user of the second client 258 is the user authenticated by the user of the first client 250.

If the data access password from the first client 250 is set at step 315, the remote sync server control unit 214 proceeds to step 316 and transmits the signal for reporting the providing of the client data to the second client 258 according to the authentication information of the target client stored at step 312. The remote sync server control unit 214 then proceeds to step 317 and provides the client data to the second client according to the authentication information. Then, the remote sync server control unit 214 proceeds again to step 300 and checks whether the sync request is received from the first client 250. Accordingly, the remote sync server 200 according to the embodiment of the present invention receives the authentication information of the target client to which the client data will be provided from the first client 250 and transmits the signal reporting that the client data has been provided to the second client 258 according to the provided authentication information of the target client. Accordingly, the second client 258, even if it does not have any connection information of the remote sync server 200, can receive the client data provided from the first client 250, and thus a free exchange of the client data can be performed between the first client 250 and the second client 258.

Figure 4:
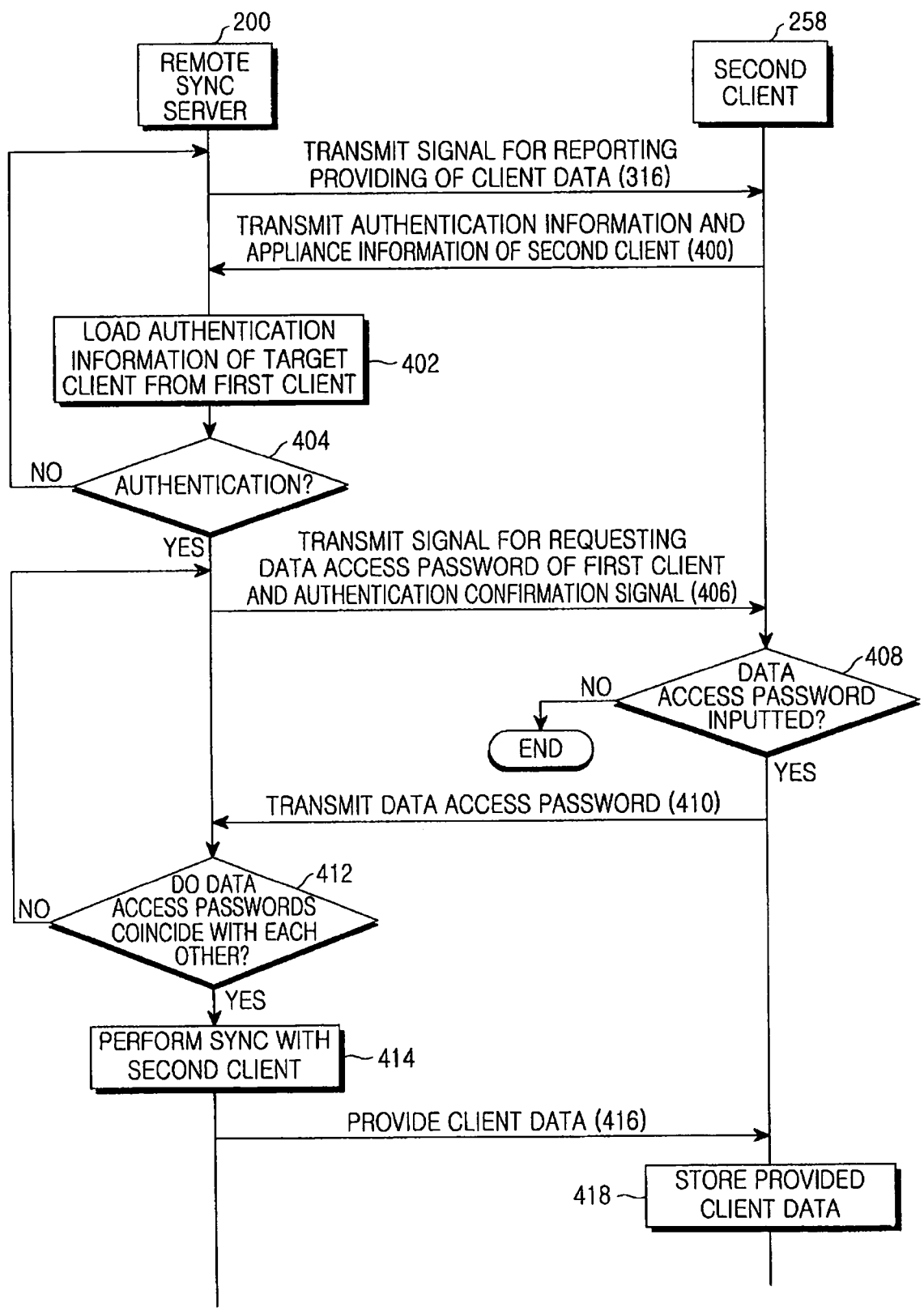
FIG. 4 is a flowchart illustrating a process of providing data to the second client that is performed by a remote sync server in the SyncML data sync system according to an embodiment of the present invention.

FIG. 4 is a flowchart illustrating the process (i.e., step 317 of FIG. 3) of providing the client data to the second client 258 that is performed if the transmission of the client data from the first client 250 is completed in the SyncML data sync system according to an embodiment of the present invention.

Referring to FIG. 4, if the signal for reporting the providing of the client data from the remote sync server 200 is transmitted to the second client 258 at step 316 of FIG. 3, the second client 258 proceeds to step 400 and transmits the authentication information of the second client 258 and the appliance information of the second client 258, as described below. If the second client 258 does not have the information on the remote sync server, the remote sync server 200 transmits the sync server information through an OTA (Over The Air) channel, and then transmits the authentication information and the appliance information of the second client 258 through the remote interface or the SyncML protocol of an OMA (Open Mobile Alliance).

Here, the authentication information of the second client 258 means identification (ID) information for identifying the second client such as the caller ID of the second client 258 or the user information of the second client 258. Here, the appliance information of the second client 258 includes interface information used in the second client 258. Accordingly, if the remote sync server 200 receives the appliance information from the second client 258, it can recognize whether or not a remote sync through HTTP or TCP/IP protocol is possible.

Then, the remote sync server 200 proceeds to step 402 and loads the authentication information of the target client stored at step 312 of FIG. 3 from the first client 250. Then, the remote sync server 200 proceeds to step 404 and determines whether the second client 258 is the target client authenticated by the first client 250 by comparing the loaded authentication information of the target client with the authentication information of the second client 258. If the second client 258 is not the target client authenticated by the first client 250, the remote sync server proceeds again to step 316 and transmits the signal for reporting the providing of the client data to the client according to the authentication information of the target client.

Meanwhile, if the second client 258 is the target client at step 404, the remote sync server 200 proceeds to step 406 and transmits an authentication confirmation signal and a signal for requesting the data access password set at step 315 of FIG. 3 to the second client 258. The second client 258 that has received the signal for requesting the data access password proceeds to step 408 and displays a menu screen for requesting the user of the second client 258 to input the data access password. If the user of the second client 258 inputs the data access password, the second client 258 proceeds to step 410 and transmits the data access password input by the user of the second client 258 to the remote sync server 200.

The remote sync server 200 that has received the data access password from the second client 258 proceeds to step 412 and determines whether the received data access password coincides with the data access password set at step 315 of FIG. 5 by comparing the two passwords. If the received data access password does not coincide with the set data access password, the remote sync server 200 proceeds again to step 406, transmits the signal for requesting the data access password to the second client 258, and then repeats steps 408 to 410. Meanwhile, if the data access password received from the second client 258 at step 412 coincides with the data access password stored at step 315 of FIG. 3, the remote sync server 200 authenticates that the user of the second client 258 is the authenticated user who can receive the client data from the user of the first client 250. Then, the remote sync server 200 proceeds to step 414, performs the sync with the second client 258, and provides the client data input from the first client 250 to the second client 258 at step 416.

At step 416, the remote sync server 200 provides the client data to the second client 258 according to the appliance information received from the second client 258 at step 400. That is, if it is possible for the second client 200 to use the remote interface that can be used by the remote sync server 258, the remote sync server 200 provides the client data to the second client 258 through the remote interface. Meanwhile, if the second client 258 is not provided with the remote interface, the remote sync server 200 transmits the sync server information through the OTA channel, and then transmits the client data to the second client 258 through the SyncML protocol of the OMA.

If the client data for the sync is provided from the remote sync server 200 at step 416, the second client 258 proceeds to step 418 and synchronizes the client data provided at step 416 with the client data stored in the second client data storage unit 266 to store the synchronized client data. Accordingly, if the second client does not have the information on the remote sync server 200, the remote sync server transmits the sync server information through the OTA channel according to the appliance information of the second client 258, and then transmits the client data of the first client 250 to the second client 258 through the SyncML protocol of the OMA, so that the client data can be exchanged between the first client 250 and the second client 258 without any restrictions in distance.

As described above, according to the present invention, the authentication information of the target client to which a certain client will provide the client data is received, and a signal for reporting the providing of the client data and connection information of the remote sync server are transmitted to a specified client according to the received authentication information of the target client. Also, the client data is provided through a remote interface or the SyncML protocol of the OMA according to the appliance information of the target client. Accordingly, even if the target client does not have any connection information of the remote sync server, it can receive the client data from the client, and a free exchange of the client data can be performed between the client and the target client without any restrictions in distance.

Although it is assumed that the remote sync server, the first client and the second client are connected together through the remote interface in the embodiment of the present invention, it will be apparent that the present invention can also be applied to a local SyncML data sync system that uses a local interface such as Bluetooth, IrDA, USB cables, etc.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A SyncML (Synchronization Markup Language) data synchronization (sync) system for data exchange between clients, comprising: a first client having client data to be provided to another client and authentication information of a second client to which the client data is provided, the authentication information includes a caller IDentification (ID) of the second client;

the second client having the caller ID; and a sync server, having a memory, for performing a sync with the first client, receiving the client data and the authentication information through the sync, receiving a data access password for the client data from the first client, transmitting a sync request signal to the second client having the caller ID, receiving a password from the second client, determining whether the received password from the second client is identical with the data access password, and performing a sync with the second client if the received password from the second client is identical with the data access password;

wherein the sync server comprises:

a sync request and push module for transmitting the sync request signal and a signal for reporting the providing of the client data to the second client if an input of the client data from the first client is completed;

a client registration module for storing information on the first client and the authentication information of the second client provided from the first client;

an authentication module for authenticating the second client according to the authentication information of the second client; and a sync server control unit for transmitting the signal for reporting the providing of the client data to the second client by controlling the sync request and push module, performing the sync with the second client according to an authentication result of the second client provided from the authentication module, and transmitting the client data to the second client.

2. The SyncML data sync system as claimed in claim 1, wherein if a signal reporting that the data has been provided from the sync server, the second client transmits the authentication information of the second client in response to the received signal.

3. The SyncML data sync system as claimed in claim 1, the authentication information further comprises user information of the second client.

4. The SyncML data sync system as claimed in claim 1, wherein the client data is one of PIM (Personal Information Management) data of the first client and contents data stored in the first client.

5. The SyncML data sync system as claimed in claim 1, wherein the sync server receives appliance information of the second client from the second client through a SyncML protocol remote interface of an OMA (Open Mobile Alliance), and provides the client data to the second client through one of the SyncML protocol of the OMA and a remote interface according to the appliance information.

6. The SyncML data sync system as claimed in claim 5, wherein the appliance information is information on whether the second client can use the remote interface.

7. The SyncML data sync system as claimed in claim 5, wherein the remote interface is one of an HTTP protocol and a TCP/IP protocol.

8. The SyncML data sync system as claimed in claim 1, wherein the first client and the second client are mobile communication terminals which are connected to the sync server using one of a remote interface and a local interface.

9. The SyncML data sync system as claimed in claim 1, wherein the sync server initiates a sync process with the second client which is not connected to the sync server by transmitting the sync request signal to the second client having the caller ID.

10. A Synchronization Markup Language (SyncML) data synchronization (sync) server for data exchange between first and second clients comprising:
a memory;
a sync request and push module for transmitting, from the server, a sync request signal and a signal for reporting the providing of client data to the second client if an input of the client data from the first client is completed;
a client registration module for storing, in the server, information on the first client and authentication information of the second client provided from the first client;
an authentication module for authenticating the second client at the server according to the authentication information of the second client; and
a sync server control unit configured to perform a sync between the server and the first client, receive client data and the authentication information at the server through the sync, receive a data access password for the client data at the server from the first client, transmit the sync request signal from the server to the second client having a caller ID using the sync request and push module, receive a password at the server from the second client, determine whether the received password from the second client is identical with the data access password for authentication at the authentication module, perform a sync between the server and the second client if the received password from the second client is identical with the data access password, transmit the client data to the second client, and transmit the signal for reporting the providing of the client data to the second client by controlling the sync request and push module.

11. The SyncML data sync server as claimed in claim 10, wherein the server initiates a sync process with the second client which is not connected to the sync server by transmitting the sync request signal to the second client having the caller ID.

* * * * *